Patented Jan. 29, 1935

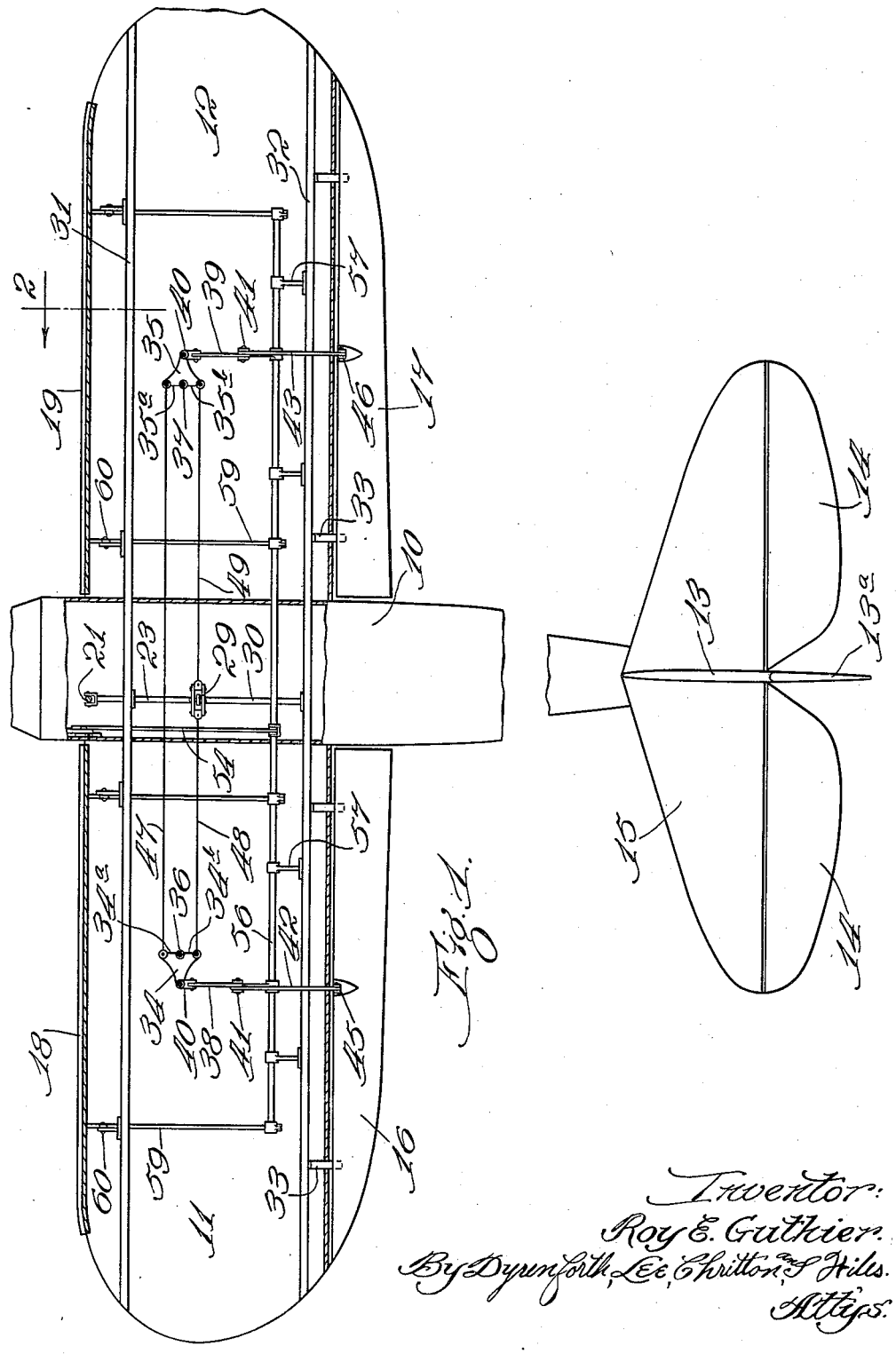

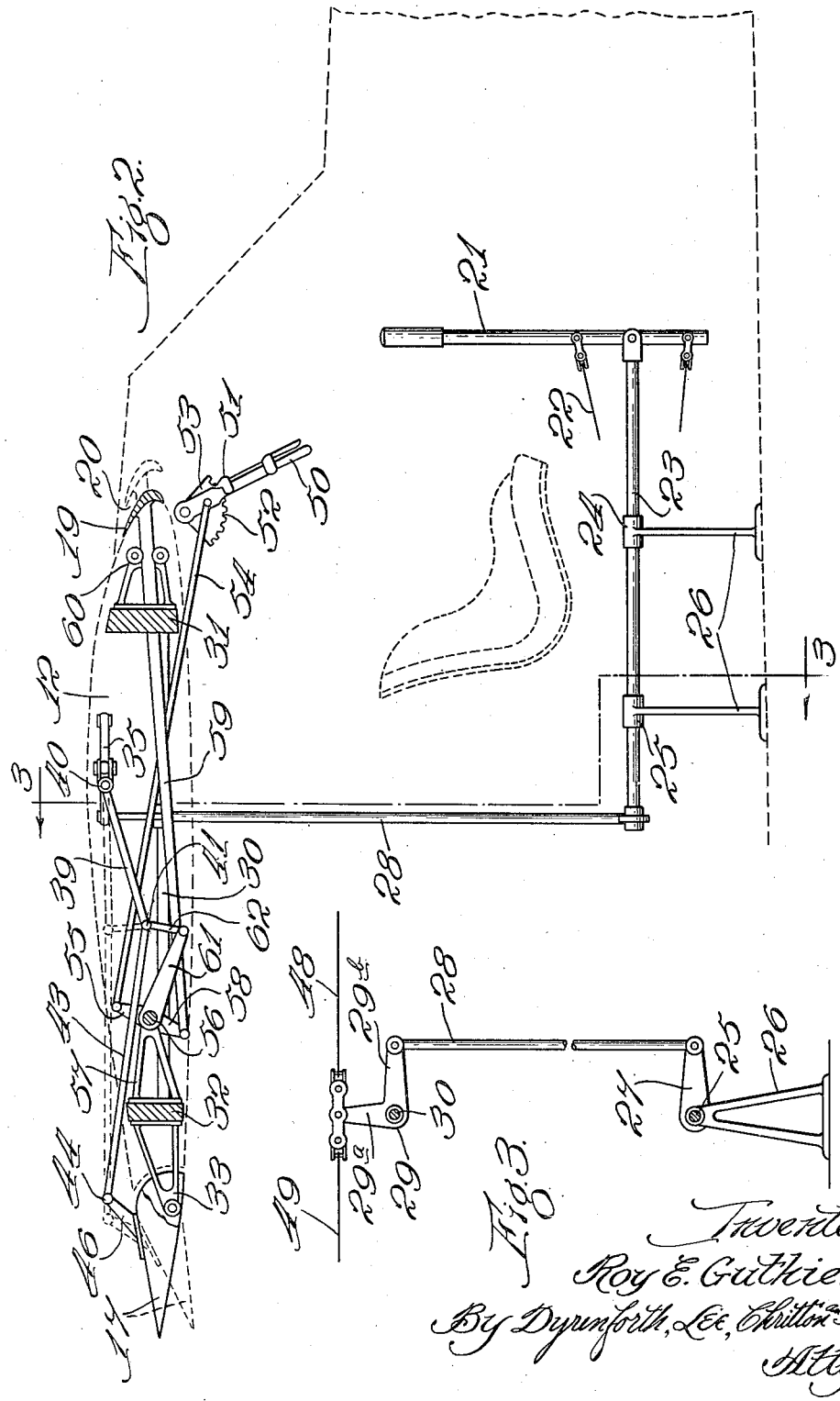

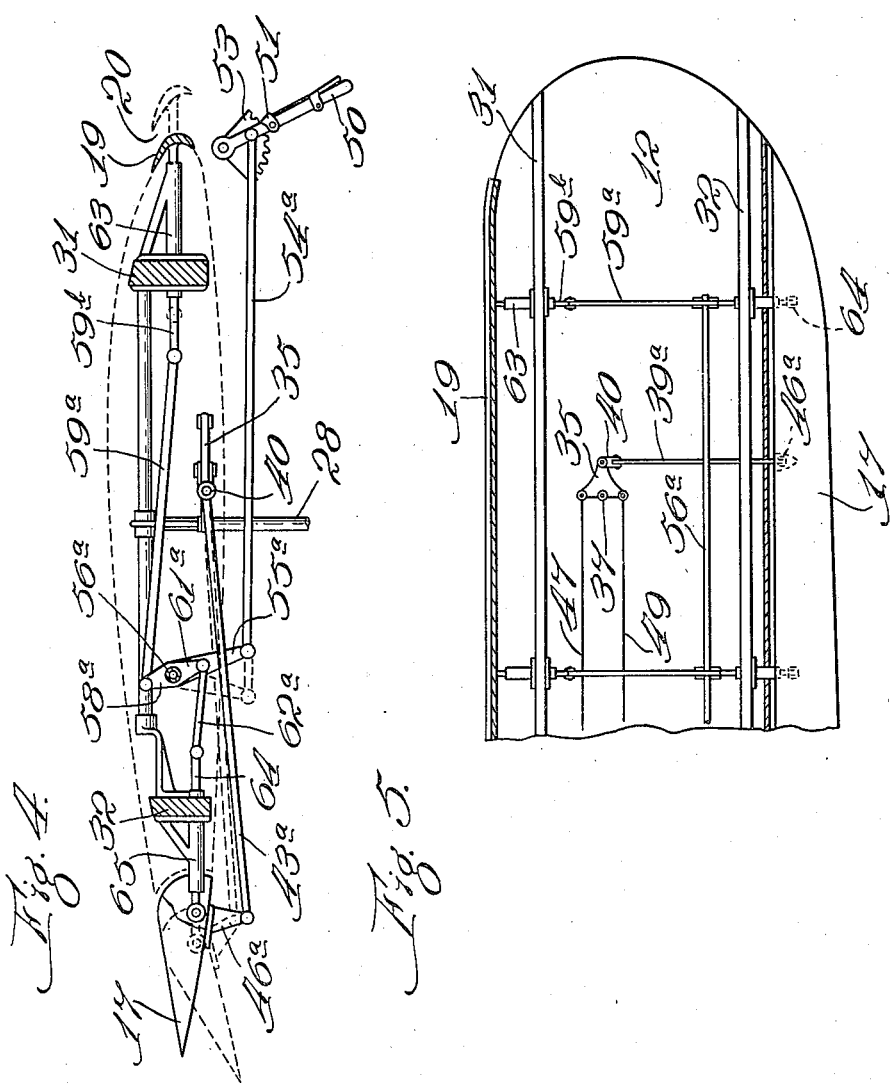

1,989,358

UNITED STATES PATENT OFFICE 1,989,358

AIRPLANE

Roy E. Guthier, Chicago, Ill.

Application November 25, 1932, Serial No. 644,365

3 Claims. (Cl. 244—12)

This invention relates to airplanes and, particularly, to means for changing the camber of the wings.

An object of the present invention is to provide means whereby the camber of airplane wings may be varied, thus changing the flight characteristics thereof before the airplane has taken off or while it is in flight. A further object is to provide the wings of an airplane with adjustable surfaces and control connections therefor, whereby the resistance or drag, corresponding speed and lifting co-efficient may be readily adjusted as desired and to meet different flying conditions.

One form of the invention is embodied in an airplane comprising ailerons pivoted near the trailing edges of the wings and airfoils extending from the leading edges of the wings. A system of controls operatively connects the ailerons to the joy stick of the airplane so that it may be manipulated to displace the aileron on one wing downwardly and on the other wing upwardly, or vice versa, depending upon the direction in which the aviator wishes to roll his plane around the longitudinal axis thereof. Incorporated in the system of controls is improved means whereby the ailerons may be angularly displaced in the same direction around their pivotal axes and the airfoils extended to form a leading edge airslot when the aviator wishes to change the flight characteristics of the plane.

The construction is such that the camber of the wings may be changed to develop more drag and a higher lift co-efficient when the plane is in flight or before it has taken off. The aviator may, at any time, simultaneously control the aileron action of the machine and its flight characteristics.

The construction illustrated is such that the aviator may control the flight characteristics of the plane with his left hand while he is manipulating the joy stick with his right hand. Two relatively simple forms of controls have been shown and it is to be understood that other forms of control may be employed within the scope of the present invention.

A feature of the present invention is that the entire wing area is made available for increase in camber, thus developing the maximum increase in lift co-efficient.

Another feature of the invention is that it enables the employment of planes having a smaller wing area with a corresponding increase in speed without a decrease in the load. Another feature of the invention is that planes having reduced wing area may take off and land at the same or slower speeds than conventional airplanes with larger wing area. Another feature of the invention is that the longitudinal stability of the airplane is not affected during operation as the camber is increased at the same time that the air slots are opened. Another feature is that the invention is adapted to all types of airplanes. A further feature is that the general stability and controllability of planes equipped with the invention are markedly improved under all expectable conditions and particularly that it greatly increases the lift co-efficient and the angle of stall.

The invention will be readily understood from the following description in conjunction with the drawings, in which—

Figure 1 is a plan view, partly broken away, of an airplane which embodies the invention; Fig. 2 is a section taken substantially on line 2 of Fig. 1; Fig. 3 is a section taken substantially on line 3 of Fig. 2; Fig. 4 is a section of a wing embodying the modified system of control; and Fig. 5 is a fragmentary plan view of a wing embodying the modification disclosed in Fig. 4.

Referring to the drawings, in which like numerals designate the same parts throughout the several views, 10 designates the fuselage of an airplane of conventional construction, except as hereinafter noted, provided with wings 11 and 12. The airplane is also equipped with the usual vertical fin 13, rudder 13ª, elevator 14 and stabilizer 15. Suitable landing gear, propeller and a power plant are supplied but are not shown as they are of conventional design. The trailing edges of the wings are provided with ailerons 16 and 17 pivoted thereto. Airfoils 18 and 19 are extensibly mounted at the leading edge of each wing so as to open leading edge airslots 20. The ailerons and airfoils are shown extending the full span of the wings. It should be understood that the invention herein is not limited to ailerons and airfoils that extend the full length of the wings but that ailerons and airfoils of varying span and chords may be employed. The ailerons normally lie in a neutral position wherein they are disposed in the same plane and do not tend to roll the ship around its longitudinal axis. In Figs. 2 and 4, the ailerons and airfoils are shown in their neutral position which is a position of high speed and low drag.

It is to be understood that if the ailerons are lowered and the airfoils extended, as shown by dotted lines in Figs. 2 and 4, the ship acquires a higher lift and higher drag characteristics and the angle of stall is increased.

The cockpit of the plane is provided with the usual "stick" 21 operatively connected by cables 22 with the elevator 14. The stick may be manipulated to displace the ailerons 16 and 17 in opposite directions to roll the ship on its longitudinal axis.

A preferred means of controlling the ailerons and airfoils is shown in Figs. 1 to 3.

The joy stick 21 is pivoted to the forward end of the torque tube 23 mounted on bearings 24 and 25 rigidly connected to the fuselage by brackets 26. A lever 27 connects the rear end of the torque tube with the lower end of the aileron strut 28. The upper end of the strut is secured to the arm 29^b of the bell crank 29 mounted on a support 30. The support 30 extends between the forward wing beam 31 and the rear wing beam 32 and is braced thereby.

The ailerons 16 and 17 are pivoted near their lower forward edges to the wings 11 and 12, respectively, by hinged brackets 33 rigidly secured to the rear wing beam 32. Lever members 34 and 35 are associated, respectively, with ailerons 16 and 17. The lever members 34 and 35 are pivoted on vertically disposed pins 36 and 37 mounted in the wings 11 and 12 in front of the ailerons 16 and 17. The lever members 34 and 35 are respectively equipped with struts 38 and 39 by means of universal joints 40. The struts 38 and 39 are pivoted by means of pins 41 to struts 42 and 43. The struts 42 and 43 are, in turn, pivotally connected by pins 44 to control horns 45 and 46 rigidly attached to the upper surface of the ailerons 16 and 17, respectively.

The lever member 34 is provided with oppositely disposed arms 34^a and 34^b, and the lever member 35 is likewise formed with oppositely disposed arms 35^a and 35^b. The arms 34^a and 35^a are connected by a cable 47 and the arms 34^b and 35^b are connected to the upper arm 29^a of the bell crank 29 by cables 48 and 49, respectively.

The cockpit of the plane is provided, preferably at a position convenient to the left hand of the pilot, with a depending actuating lever 50 pivotally mounted on the fuselage. The lever 50 is equipped with a latch member 51 adapted to releasably engage notches 52 on a segment 53 rigidly secured to the fuselage. One end of an operating strut 54 is pivotally joined to the actuating lever 50 and its other end is pivotally mounted on a lever 55. The other end of the lever 55 is firmly secured to and is adapted to rotate a longitudinal torque tube 56 journaled in brackets 57 rigidly fixed to the longitudinal beam 32. A series of levers 58 firmly attached to the torque tube 56 at spaced points connect the torque tube with a series of struts 59 operating in roller guides 60 supported by the beam 31 and adapted to carry the leading edge airfoils 18 and 19. The torque tube 56 is connected to the ailerons 16 and 17 by rigidly mounted arms 61 pivotally joined to links 62 and cooperating with the pivot 41 which, in turn, links the aileron control rods, as previously set out.

The operation of the above-described controls is substantially as follows. Assuming that the ailerons 16 and 17 and the leading edge airfoils are in their neutral position so that the wings have low lift and drag co-efficients and that the joy stick 21 is angularly displaced around the longitudinal axis of the torque tube 23 to the left of the pilot, the torque tube and the lever 27 will be displaced in the same direction to draw the aileron strut 28 downwardly and with it, the arm 29^b of the bell crank 29. The displacement of the bell crank moves the cables 48 and 49 to the left and the cable 47 to the right, causing the lever members 34 and 35 to be angularly moved in a clockwise direction. The displacement of the lever member 34 causes the operating struts 38 and 42 to raise the aileron 16. Likewise, the displacement of the lever member 35 in a clockwise direction causes the operating struts 39 and 43 to depress the aileron 17.

If the joy stick 21 is angularly displaced to the right of the pilot, the connections between the joy stick and the ailerons 16 and 17 will cause the aileron 17 to be raised and will depress the aileron 16.

Likewise, assuming again that the ailerons and airfoils are in their neutral position, it is readily understood that if the joy stick is not displaced, rearward movement of the actuating lever 50 will cause the operating strut 54 and lever 55 to rotate the torque tube 56 in a counter-clockwise direction (Fig. 2). Rotation of the torque tube 56 in a counter-clockwise direction pushes struts 59 forwardly, distending the leading edge airfoils 18 and 19, thereby opening the slots 20.

Rotation of the torque tube 56 in a counter-clockwise direction likewise causes the levers 61 and links 62 to elevate the struts 38 and 42, and 39 and 43, thereby depressing ailerons 16 and 17.

It is to be understood that the rearward movement of the actuating lever 50 depresses the ailerons 16 and 17 and extends the airfoils 18 and 19 as a unit and that forward movement of the lever 50 returns the ailerons and airfoils to their neutral positions.

It will also be understood that the joy stick 21 and the actuating lever 50 may be manipulated simultaneously if it is so desired. Also, if it is assumed that the actuating lever 50 has been manipulated to depress the ailerons and to extend the airfoils, the joy stick may be manipulated afterward to elevate one of the ailerons and depress the other still farther.

A modified airfoil and aileron control means is shown in Figs. 4 and 5. It is to be understood that my invention is not limited to the means of control shown but that other means may be employed within the scope of the invention. In Figs. 4 and 5, the plane is preferably equipped with ailerons 17, airfoils 19 and longitudinal wing beams 31 and 32 similar in construction to those previously described. The joy stick is operatively connected to the aileron 17 by torque tube and lever, previously described, associated with the aileron strut 28 which, in turn, is linked to the bell crank 29. Cables 47, 48 and 49 operatively connect the upper arm of the bell crank to a lever member 35 pivoted on a vertically disposed pin 37. The extremity of the lever member 35 is joined to an operating strut 39^a by a universal connection 40. The operating strut 39^a is, in turn, pivotally connected to an aileron horn 46^a rigidly secured to the underside of the aileron 17.

The cockpit of the plane is likewise provided with a depending actuating member 50, equipped similarly to the one previously described, and pivotally connected to one end of an operating strut 54^a. The other end of the operating strut is pivotally joined to a lever 55^a rigidly mounted on and adapted to rotate a longitudinal torque tube 56^a.

Levers 58^a connect the torque tube with actuating struts 59^a, pivotally joined to airfoil carrying members 59^b. The airfoil carrying members work through guide tubes 63 fixedly secured to the beam 31 and are adapted to extend and retract the airfoils 19.

The torque tube 56ª is also provided with levers 61ª operating reciprocally with the levers 58ª. One end of each of a plurality of strut links 62ª is pivotally joined to the levers 61ª and the other ends are similarly connected to extension members 64 which form the hinge supports of the ailerons and work through guide tubes 65 secured to the wing beam 32.

The operation of the modification is substantially the same as that previously described, in that, assuming that the ailerons and airfoils are in their neutral position, angular displacement of the joy stick to the left causes the operating strut 43ª to depress the aileron 17 while the other aileron is correspondingly raised. If the joy stick is displaced to the right of the pilot, the aileron action is reversed.

Assuming, again, that the ailerons and airfoils are in their neutral positions, rearward movement of the actuating member 50 rotates the torque tube 56ª, thereby extending the airfoils and ailerons and at the same time depressing the ailerons on the aileron horns 46ª. It is to be understood that the joy stick and actuating member 50 may be operated independently or together, as previously pointed out.

In operation, the ailerons are preferably depressed and the airfoils extended, when the airplane is about to take off to take advantage of the increased lifting co-efficient in that position. If the aviator wishes to turn or bank while taking-off, the joy stick may be manipulated to differentially displace the ailerons. After the plane is in flight, the ailerons and airfoils are returned to their neutral positions so that the wings will have the characteristics of low lift, low drag and high speed. When it is desired to land the plane, the ailerons are again depressed and the airfoils extended to obtain the high lift and low speed characteristics.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. An airplane comprising a body portion, wings extending from said body portion, ailerons pivoted on said wings, airfoils mounted on the leading edges of said wings, means for extending said airfoils in front of said wings to form leading edge air slots, a joy stick, aileron control means in said wings connecting said joy stick and said ailerons, said means including a pair of toggle members, a manual control, and pivoted means connecting said manual control to the junction of said toggle members and to said means for extending said airfoils, whereby said airfoils may be extended and said ailerons lowered simultaneously.

2. An airplane comprising a fuselage, wings, ailerons pivoted on said wings, leading edge airfoils mounted on said wings, a push rod for extending said airfoils in front of said wings to form leading edge air slots, a joy stick, aileron control means connecting said joy stick and said ailerons, said means including a pair of link members, a pivoted member connected to the break between said links and said push rod, and a manual control independent of said joy stick to turn said pivoted member.

3. An airplane comprising a fuselage, wings, ailerons pivoted on said wings, leading edge airfoils mounted on said wings, a push rod for extending said airfoils in front of said wings to form leading edge air slots, a joy stick, aileron control means connecting said joy stick and said ailerons, said means including a pair of link members, a rotatable longitudinal shaft journaled in said wings, a second pair of link members connecting the junction of said first-mentioned link to said shaft, a member pivoted on said shaft and secured to said push rod, and a manual control connected to said pivoted member to turn said member.

ROY E. GUTHIER.